(12) United States Patent
Narippatta

(10) Patent No.: US 9,756,406 B1
(45) Date of Patent: Sep. 5, 2017

(54) SYSTEMS, APPARATUS, AND METHODS FOR A CONFIGURABLE GEARBOX

(71) Applicant: Infinera Corporation, Annapolis Junction, MD (US)

(72) Inventor: Vinod Narippatta, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/235,834

(22) Filed: Aug. 12, 2016

Related U.S. Application Data

(60) Provisional application No. 62/323,225, filed on Apr. 15, 2016.

(51) Int. Cl.
| | |
|---|---|
| *H04B 10/00* | (2013.01) |
| *H04Q 11/00* | (2006.01) |
| *G11C 7/10* | (2006.01) |
| *H04J 14/00* | (2006.01) |

(52) U.S. Cl.
CPC .......... *H04Q 11/0005* (2013.01); *G11C 7/10* (2013.01); *H04Q 2011/0058* (2013.01)

(58) Field of Classification Search
CPC ....... H04L 49/00; H04L 49/10; H04L 49/101; H04L 49/15; H04L 49/1507; H04L 49/45
See application file for complete search history.

(56) References Cited

U.S. PATENT DOCUMENTS

| | | | |
|---|---|---|---|
| 9,235,540 B1* | 1/2016 | Langhammer | G06F 13/36 |
| 2014/0270765 A1* | 9/2014 | Cole | H04B 10/27 |
| | | | 398/48 |

* cited by examiner

*Primary Examiner* — Daniel Dobson
(74) *Attorney, Agent, or Firm* — David L. Soltz

(57) ABSTRACT

Systems, apparatus, and methods for a configurable gearbox with a variable number of input lanes and output lanes and a multiplexer for each output lane that can be configured to dynamically select any of the input lanes during each clock cycle.

20 Claims, 7 Drawing Sheets

300

| output lane | Clock Cycle | | | | | | | | |
|---|---|---|---|---|---|---|---|---|---|
| | clk-1 | clk-2 | clk-3 | clk-4 | clk-5 | clk-6 | clk-7 | clk-8 | clk-9 |
| 220-0 | 210-0 | 210-5 | 210-3 | 210-1 | 210-6 | 210-4 | 210-2 | 210-0 | 210-5 |
| 220-1 | 210-1 | 210-6 | 210-4 | 210-2 | 210-0 | 210-5 | 210-3 | 210-1 | 210-6 |
| 220-2 | 210-2 | 210-0 | 210-5 | 210-3 | 210-1 | 210-6 | 210-4 | 210-2 | 210-0 |
| 220-3 | 210-3 | 210-1 | 210-6 | 210-4 | 210-2 | 210-0 | 210-5 | 210-3 | 210-1 |
| 220-4 | 210-4 | 210-2 | 210-0 | 210-5 | 210-3 | 210-1 | 210-6 | 210-4 | 210-2 |

FIG. 2

SYSTEMS, APPARATUS, AND METHODS FOR A CONFIGURABLE GEARBOX

CLAIM OF PRIORITY UNDER 35 U.S.C. §120

The present Application for Patent claims priority to provisional U.S. Patent Application No. 62/323,225, entitled "Systems, Apparatus, and Methods for Configurable Switch," filed Apr. 15, 2016, assigned to the assignee hereof, and expressly incorporated herein by reference in its entirety.

FIELD OF DISCLOSURE

This disclosure relates generally to packet optical communication networks and more specifically, but not exclusively, to configurable gearboxes with cross-bar switches in packet optical communication networks.

BACKGROUND

Packet optical communication networks rely on many types of devices to enable effective data flow in the networks. One such device is a switch that allows a node to switch data flows between input lines and output lines. Conventional switch designs require the conversion of the input width of a data bus (number of input lines) to the output width of the data bus (number of output lines) for easier processing of the data flow and in most such cases the conversion is fixed during the manufacturing process and a different conversion design is required for different input lines versus output lines. However, such conventional switches cannot handle cases where the input width and the output width of the data bus are not fixed and dynamically change.

Accordingly, there is a need for systems, apparatus, and methods for configuring a gearbox of a switch that allows the number of input lanes and output lanes to dynamically change.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, an apparatus comprises: a plurality of output lines; a plurality of multiplexers, each of the plurality of multiplexers coupled to a respective one of the plurality of output lines; a plurality of input lines, each of the plurality of input lines coupled to each of the plurality of multiplexers; a plurality of select lines, each of the plurality of select lines coupled to a controller and a respective one of the plurality of multiplexers; and wherein the controller dynamically couples at least one of the plurality of output lines to at least one of the plurality of input lines during a first clock cycle.

In another aspect, a method comprises: dynamically coupling, by a controller, at least one of a plurality of output lines to at least one of a plurality of input lines during a first clock cycle; wherein the controller is coupled to each of a plurality of select lines, each of the plurality of select lines being coupled to a respective one of a plurality of multiplexers; and wherein each the plurality of multiplexers is coupled to a respective one of the plurality of output lines and each of the plurality of multiplexers is coupled to each of a plurality of input lines.

In still another aspect, a non-transient computer readable medium containing program instructions for causing a processor to perform a process comprising: dynamically coupling, by a controller, at least one of a plurality of output lines to at least one of a plurality of input lines during a first clock cycle; wherein the controller is coupled to each of a plurality of select lines, each of the plurality of select lines being coupled to a respective one of a plurality of multiplexers; and wherein each the plurality of multiplexers is coupled to a respective one of the plurality of output lines and each of the plurality of multiplexers is coupled to each of a plurality of input lines.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2 illustrates an exemplary operation of a switch for 7 inputs and 5 outputs in accordance with some examples of the disclosure.

Figure 1:
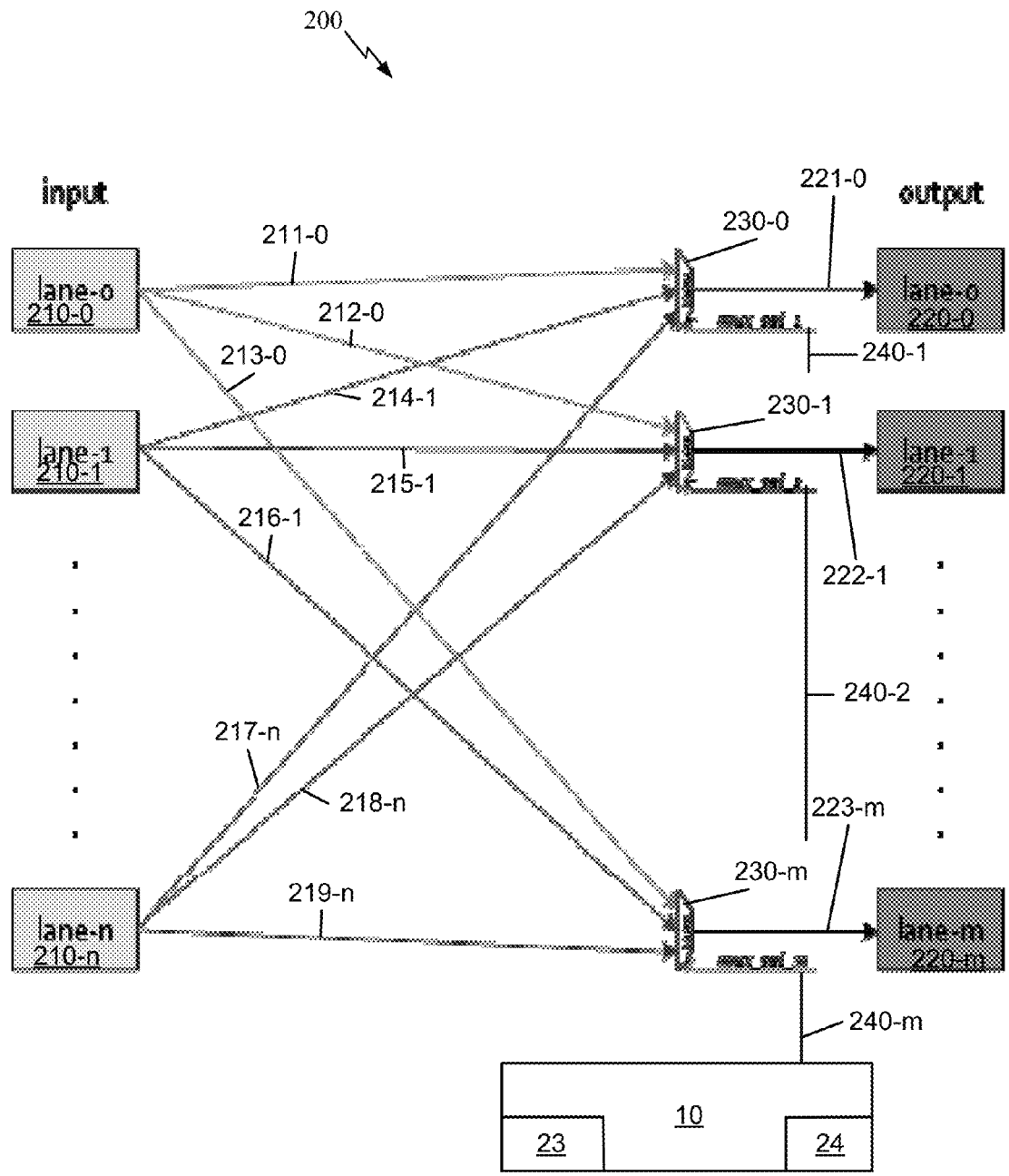
FIG. 1 illustrates an exemplary gearbox in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. In some examples, the systems, methods, and apparatus herein include a gearbox that has multiple multiplexers with each multiplexer couple to each of a multitude of inputs and one output. The multiplexers in the gearbox may dynamically couple a variable number of inputs of the multitude of inputs to the outputs during each clock cycle. When the number of inputs is greater than the number of outputs, not all inputs can be coupled to an output at the same time. As shown in the example of FIG. 2 and described in more detail below, 7 inputs must be coupled to only 5 outputs. All 7 inputs cannot be coupled to one of the 5 outputs at the same time. Thus, the gearbox will rotate which of the inputs is coupled to an output during each successive clock cycle. In the first clock cycle, for example, inputs 1-5 are coupled to the outputs 1-5. In the second clock cycle, the gearbox will couple inputs 6-7 (the 2 inputs that were missed in the first clock cycle) to outputs 1-2 along with coupling the inputs 1-3 to outputs 3-5. In the third clock cycle, the gearbox will couple inputs 4-7 and input 1 to outputs 1-5. After three clock cycles, input 1 has been coupled to output 1 in the first clock cycle, to output 3 in the second clock cycle, and to output 5 in the third clock cycle. The gearbox will continue to rotate which input is coupled to an output in this fashion using the formula new_mux_sel=(old_mux_sel+number_of_output_lanes) modulo number_of_input_lanes to derive the output selection for a particular input. As can be seen in the table of FIG. 2, this will allow all 7 inputs to be coupled to the outputs an even number of times during the first seven clock cycles. This results in each input being coupled to each of the outputs once during each set of seven clock cycles. Thus, the modulo formula generalizes a round-robin distribution of the N-Input lanes into the M-Output lanes when N>=M. In this fashion, the gearbox can efficiently distribute the number of times each of the inputs is coupled to an output over a given time period so that none of the inputs incur any greater latency as the inputs are clocked through the gearbox. In other words, no input is penalized with an increase in latency even though the number of inputs exceeds the number of outputs. In earlier approaches, different gearboxes were required for each N/M combination.

Since each input is coupled to each of a plurality of multiplexers in the gearbox, the gearbox is able to accommodate all of the inputs or a portion of the inputs providing the capability to modify the number of inputs coupled to the outputs as well as the number of outputs to use for a given combination. This allows the gearbox to dynamically change the number of inputs that can be coupled to the outputs as well as allowing the gearbox to maintain an efficient distribution of input couplings using the modulo formula. In contrast, the conventional switch is limited to only using the pre-designed arrangement of couplings between a set number of inputs and a set number of outputs that cannot be varied.

FIG. 1, for example, illustrates an exemplary gearbox 200 coupled to controller 10. Gearbox 200 may include a plurality of n inputs 210-0 to 210-n, a plurality of m outputs 220-0 to 220-m, and a plurality of m multiplexers 230-0 to 230-m. Each of the plurality of inputs 210-0 to 210-n is coupled to each of the plurality of multiplexers 230-0 to 230-m with a respective one of an input data bus lines 211-0 to 219-n. Each of the plurality of multiplexers 230-0 to 230-m is coupled to one of the plurality of outputs 220-0 to 220-m with one of an output data bus line 221-0 to 223-m. Each of the plurality of multiplexers 230-0 to 230-m is coupled to the controller 10 with one of a plurality of select lines 240-0 to 240-m (mux_sel-0 to mux_sel-m). The controller 10 is configured to use the plurality of select lines 240-0 to 240-m to dynamically configure which of the plurality of input data bus lines 211-0 to 219-n each of the plurality of multiplexers 230-0 to 230-m selects for coupling to a respective one of the plurality of output data bus lines 221-0 to 223-m. Thus, the controller 10 may selectively control which of the plurality of input data bus lines 211-0 to 219-n are coupled to which of the plurality of output data bus lines 221-0 to 223-m on a per clock cycle basis.

FIG. 2 illustrates an exemplary operation 300 of the gearbox 200 for 7 inputs and 5 outputs in accordance with some examples of the disclosure. As shown in FIG. 2, the gearbox 200 is initialized with the first output 220-0 coupled to the first input 210-0, the second output 220-1 coupled to the second input 210-1, the third output 220-2 coupled to the third input 210-2, the fourth output 220-3 coupled to the fourth input 210-3, the fifth output 220-4 coupled to the fourth input 210-4 during a first clock cycle (clk-1). Since there are still two other inputs (sixth input 210-5 and the seventh input 210-6) to couple to an output, during the start of the second clock cycle (clk-2, second column), the first output 220-0 is coupled to the sixth input 210-5 and the second output 220-1 is coupled to the seventh input 210-6. Next, the controller 10 uses the plurality of select lines 240-0 to 240-4 to reconfigured the plurality of multiplexers 230-0 to 230-4 using the formula: new_mux_sel=(old_mux_sel+number_of_output_lanes) modulo number_of_input_lanes. Use of the modulo formula allows an even distribution of inputs coupled to respective outputs for scenarios when the inputs outnumber the outputs. For example, initialize each of the 5 multiplexers (per-lane) to be 0-4. For lane-0 this works out to be:

On 1st clock cycle use the initialized value to select input-lane-0
On 2nd clock cycle use the formula (0+5) modulo 7 to select input-lane-5
On 3rd clock cycle use the formula (5+5) modulo 7 to select input-lane-3
On 4th clock cycle use the formula (3+5) modulo 7 to select input-lane-1
On 5th clock cycle use the formula (1+5) modulo 7 to select input-lane-6
On 6th clock cycle use the formula (6+5) modulo 7 to select input-lane-4
On 7th clock cycle use the formula (4+5) modulo 7 to select input-lane-2
On 8th clock cycle use the formula (2+5) modulo 7 to select input-lane-0
On 9th clock cycle use the formula (5+5) modulo 7 to select input-lane-3
And the cycle repeats for each of the 5 lanes.

As shown in the example of FIG. 2, each input is coupled five times to an output during the first seven clock cycles (and each successive set of seven clock cycles thereafter):

Input lane 210-0 is coupled to output lane 220-0 in clock cycle 1, to output lane 220-1 in clock cycle 5, to output lane 220-2 in clock cycle 2, to output lane 220-3 in clock cycle 6, and to output lane 220-4 in clock cycle 3. Note that input lane 210-0 is not coupled to an output during clock cycles 4 and 7.

Input lane 210-1 is coupled to output lane 220-0 in clock cycle 4, to output lane 220-1 in clock cycle 1, to output lane 220-2 in clock cycle 5, to output lane 220-3 in clock cycle 2, and to output lane 220-4 in clock cycle 6. Note that input lane 210-1 is not coupled to an output during clock cycles 3 and 7.

Input lane 210-2 is coupled to output lane 220-0 in clock cycle 7, to output lane 220-1 in clock cycle 4, to output lane 220-2 in clock cycle 1, to output lane 220-3 in clock cycle 5, and to output lane 220-4 in clock cycle 2. Note that input lane 210-2 is not coupled to an output during clock cycles 3 and 6.

Input lane 210-3 is coupled to output lane 220-0 in clock cycle 3, to output lane 220-1 in clock cycle 7, to output lane 220-2 in clock cycle 4, to output lane 220-3 in clock cycle 3, and to output lane 220-4 in clock cycle 5. Note that input lane 210-3 is not coupled to an output during clock cycles 2 and 6.

Input lane 210-4 is coupled to output lane 220-0 in clock cycle 6, to output lane 220-1 in clock cycle 3, to output lane 220-2 in clock cycle 7, to output lane 220-3 in clock cycle 4, and to output lane 220-4 in clock cycle 1. Note that input lane 210-4 is not coupled to an output during clock cycles 2 and 5.

Input lane 210-5 is coupled to output lane 220-0 in clock cycle 2, to output lane 220-1 in clock cycle 6, to output lane 220-2 in clock cycle 3, to output lane 220-3 in clock cycle 7, and to output lane 220-4 in clock cycle 4. Note that input lane 210-5 is not coupled to an output during clock cycles 1 and 5.

Input lane 210-6 is coupled to output lane 220-0 in clock cycle 5, to output lane 220-1 in clock cycle 2, to output lane 220-2 in clock cycle 6, to output lane 220-3 in clock cycle 3, and to output lane 220-4 in clock cycle 7. Note that input lane 210-6 is not coupled to an output during clock cycles 1 and 4.

Thus each input lane is coupled to an output five times during each set of seven clock cycles and not coupled to any input two times during the same set of seven clock cycles. This will allow all 7 inputs to be coupled to the outputs same number of times during the first seven clock cycles. This results in each input being coupled to each of the outputs once during each set of seven clock cycles. In this fashion, the gearbox can efficiently distribute the number of times each of the inputs is coupled to an output over a given time period so that none of the inputs incur any greater latency as the inputs are clocked through the gearbox. In other words, no input is penalized with an increase in latency even though the number of inputs exceeds the number of outputs.

Figure 3:
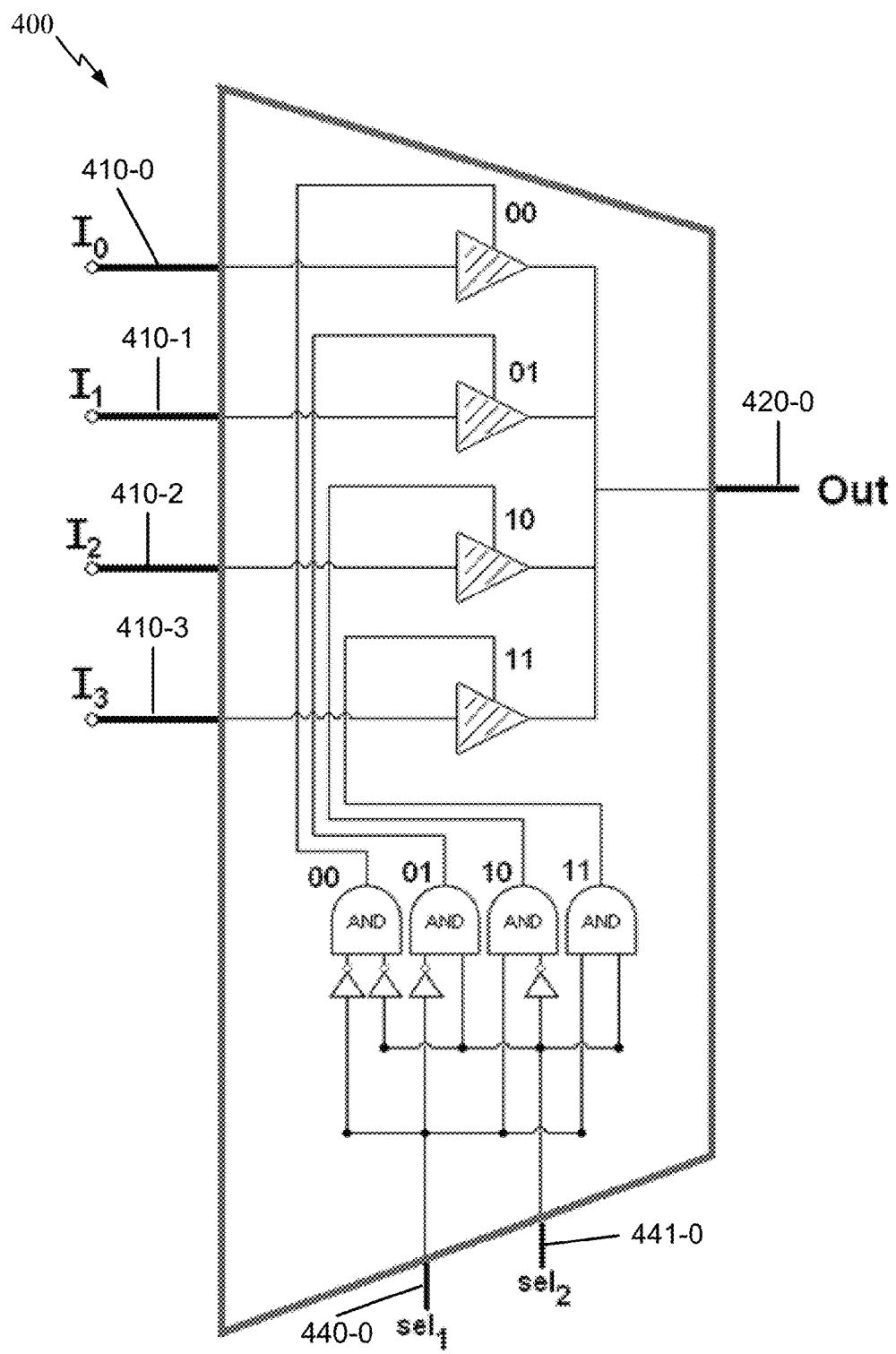
FIG. 3 illustrates an exemplary configurable multiplexer 400 in accordance with some examples of the disclosure.

FIG. 3 illustrates an exemplary configurable multiplexer 400 in accordance with some examples of the disclosure. As shown in FIG. 3, a well known conventional multiplexer 400 (e.g. any of multiplexers 230-0 to 230-m), may have four input data buses 410-0 to 410-3 and one output data bus 420-0. The multiplexer 400 may include two select lines 440-0 and 441-0 coupled to a controller 10 that enables the multiplexer 400 to selectively and dynamically couple one of the input data buses 410-0 to 410-3 to the output data bus 420-0. While two select lines 440-0 and 441-0 are shown, it should be understood that more or less select lines may be used based on the multiplexer 400 logic circuits (e.g. AND gates etc.) depending on design requirements and the number of input data buses per multiplexer 400. The boolean equation for a 4-to-1 multiplexer 400 is: Out=$(I_o*\text{Not } Sel_1*\text{Not } Sel_2)+(I_1*Sel_1*\text{Not } Sel_2)+(I_2*\text{Not } Sel_1*Sel_2)+(I_3*Sel_1*Sel_2)$. As shown, the multiplexer includes conventional AND gates and three state buffers (switches) but other components may be used as well.

Figure 4A:
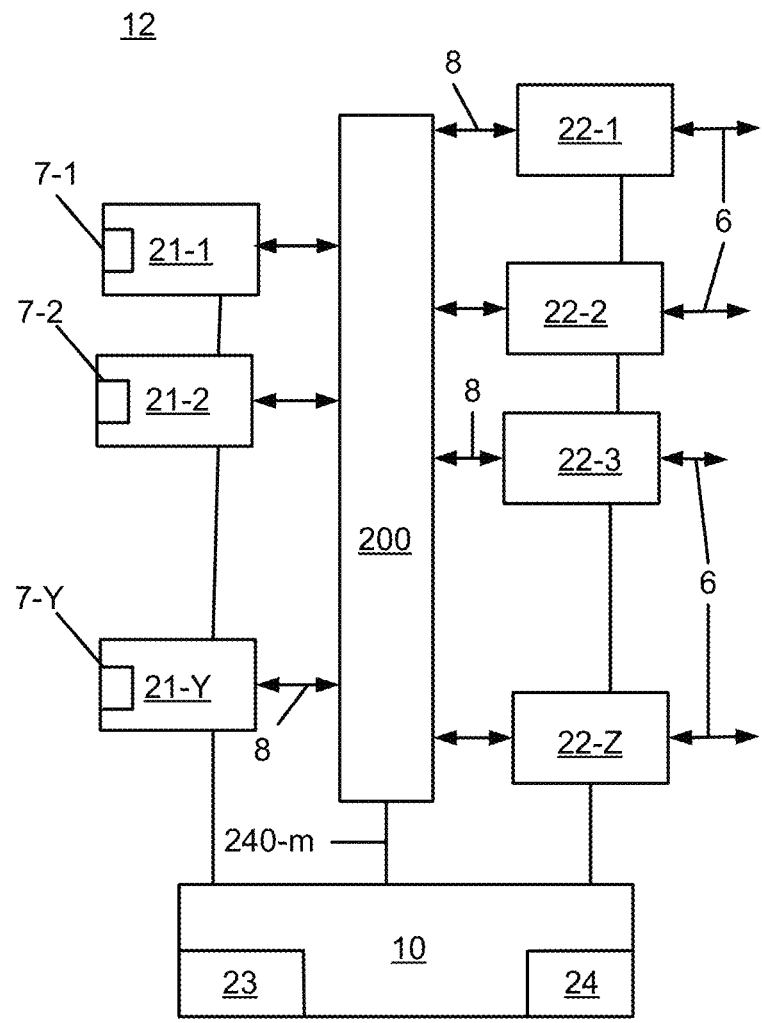
FIG. 4A illustrates an exemplary node of a network in accordance with some examples of the disclosure.

FIG. 4A is a diagram of exemplary components of a node 12. The example gearbox 200 may be incorporated in the node 12 (including the controller 10) described in FIGS. 4A-4D for use as in an optical communication network such that the gearbox 200 may allow the node 12 to dynamically switch a multitude of line cards 21-Y (e.g. an input lane 210-n) of the node 12 to a multitude of switching planes 22-Z (e.g. an output lane 220-m) of the node 12. This will allow the node 12 to dynamically change which line card 21-Y is coupled to which switching plane 22-Z. Since each line card 21-Y is connected to an input port 7 and each switching plane 22-Z is connected to an output 6, the gearbox 200 allows the node 12 to adapt to changing network traffic patterns, re-route traffic from faulty output lines to fault free output lines, etc.

As shown in FIG. 4A, node 12 may include a controller 10 configurable to control the operation of the node 12 including gearbox 200 to dynamically couple line cards or modules 21-1, 21-2, . . . , 21-Y (referred to collectively as "line modules 21," and individually as "line module 21") (where Y>=1) to switching planes 22-1, 22-2, . . . 22-Z (referred to collectively as "switching planes 22," and individually as "switching plane 22") (where Z>=1). Controller 10 may be an application, such as in a software defined network (SDN), that manages flow control to enable intelligent networking. Controller 10 may be based on protocols, such as OpenFlow, that allow servers to tell switches (e.g. node 12) where to send packets (e.g. packet 417). The controller 10 may logically lie between network devices (e.g. node 12) at one end and applications at the other end. Controller 10 may be configured such that communications between applications and devices (e.g. node 12) have to go through the controller 10. The controller 10 may include a logic circuit 23 and a memory 24 configured to uses protocols such as OpenFlow to configure network devices and choose the optimal network path (e.g. first path 460 or second path 470) for application traffic. In effect, the controller 10 may be configured to serve as a sort of operating system for the network 16. By taking the control plane off the network hardware and running it as software instead, the controller 10 may facilitate automated network management and makes it easier to integrate and administer business applications. OpenFlow is a programmable network protocol designed to manage and direct traffic among routers and switches from various vendors. It separates the programming of routers and switches from underlying hardware. OpenFlow may consists of three parts: flow tables installed on switches (e.g. node 12), a controller 10 and a proprietary OpenFlow protocol for the controller 10 to talk securely with switches 12. Flow tables are set up on switches 12. Controller 10 talks to the switches 12 via the OpenFlow protocol and impose policies on flows. The controller 10 could set up paths through the network optimized for specific characteristics, such as speed, fewest number of hops or reduced latency.

While FIG. 4A shows a particular number and arrangement of components, node 12 may include additional, fewer, different, or differently arranged components than those illustrated in FIG. 4A. Also, it may be possible for one of the components of node 12 to perform a function that is described as being performed by another one of the components. Node 12 may configured as a TDM capable optical switch, a router, a reconfigurable optical add/drop multiplexer (ROADM) such as Infinera's DTN-X packet optical transport capable switch, Infinera's EMXP packet-optical transport switch, or similar device configurable to provide Carrier Ethernet services. Node 12 may also be referred to as a device, such as a first device, a second device etc. The line module 21 may be configured as a packet switching module, such as Infinera's PXM module, that supports switching of VLAN tagged packets into ODUFlex or ODU2e circuits. This allows the node 12 to dynamically switch IP/MPLS router traffic over an OTN network using the VLAN label ID to the destination device. This may enable packet switching functionality over an OTN network with maximum network efficiency and scalability by combining the benefits of device bypass with standardized ODU0 level multi-service grooming and switching.

Line module 21 may include hardware components such as one or more ports 7-1, 7-2, . . . , 7-Y, or a combination of hardware and software components, that may provide network interface operations. While it shown that line module 21 has an input port 7 and switching plane 22 has an output 6 in FIG. 4A, it should be understood that the port 7 may be both an input and an output port so that Line module 21 may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between line modules 21. In one implementation, switching plane 22 may provide fully non-blocking transfer of data. As to be explained below, switching plane 22 may be programmed to transfer data from a particular input port 6 to a particular output port 6.

As shown in FIG. 4A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 4B:
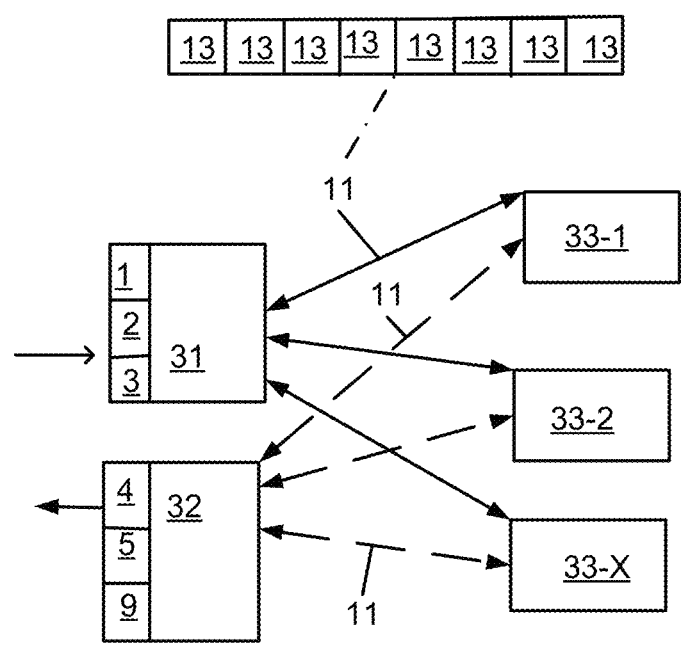
FIG. 4B illustrates an exemplary line module of the node in FIG. 1A in accordance with some examples of the disclosure.

FIG. 4B is a diagram of exemplary components of a line module 21. As shown in FIG. 4B, line module 21 may include a receiver (RX) photonic integrated circuit (PIC) 31, a transmitter (TX) PIC 32, and fabric managers (FMs) 33-1, 33-2, . . . , 33-X (referred to collectively as "FMs 33," and individually as "FM 33") (where X>=1). While FIG. 4B shows a particular number and arrangement of components, line module 21 may include additional, fewer, different, or differently arranged components than those illustrated in FIG. 4B. Also, it may be possible for one of the components of line module 21 to perform a function that is described as being performed by another one of the components. It should be understood that the receiver 31 and transmitter 32 may include discrete components instead of PICs.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 4B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 4C:
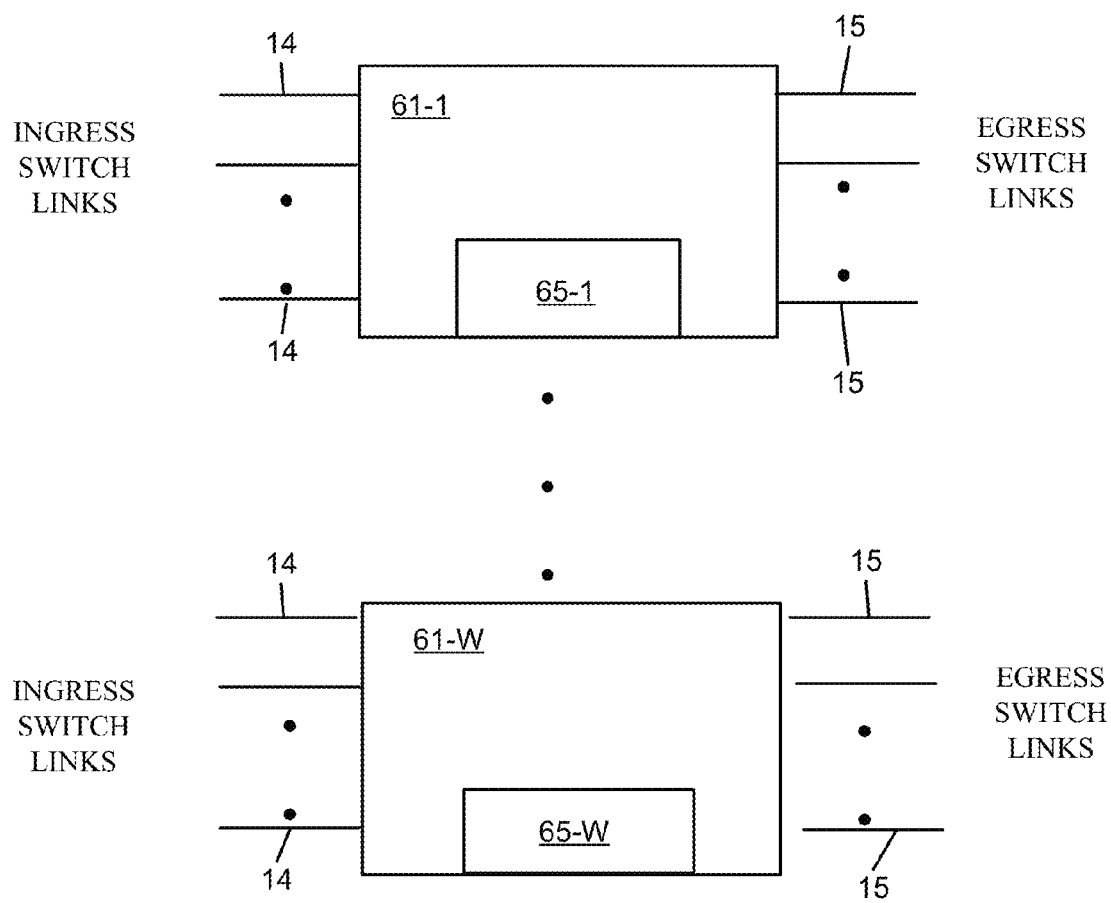
FIG. 4C illustrates an exemplary switch of the node in FIG. 1A in accordance with some examples of the disclosure.

FIG. 4C is a diagram of exemplary components of a switching plane 22. As shown in FIG. 4C, switching plane 22 may include switches 61-1, . . . , 61-W (referred to collectively as "switches 61," and individually as "switch 61") (where W>=1). While FIG. 4C shows a particular number and arrangement of components, switching plane 22 may include additional, fewer, different, or differently arranged components than those illustrated in FIG. 4C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
|---|---|---|---|
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

Figure 4D:
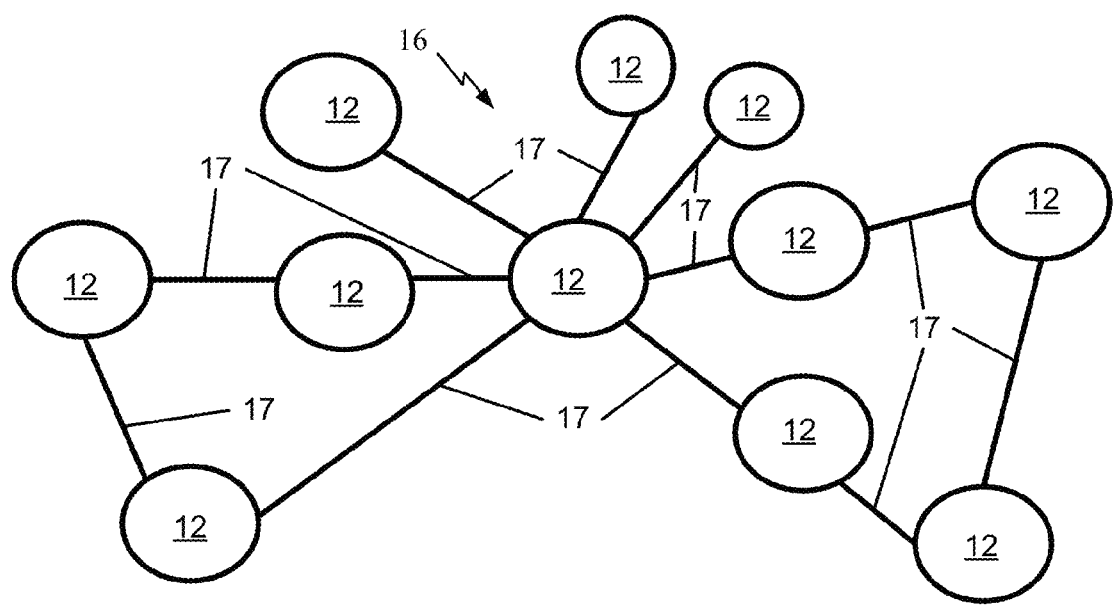
FIG. 4D illustrates an exemplary network configuration of the nodes in FIG. 1A in accordance with some examples of the disclosure.

FIG. 4D illustrates an exemplary network configuration of the nodes in FIG. 4A in accordance with some examples of the disclosure. As shown in FIG. 4D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a uni-directional or bi-direction medium such as an optical fiber capable of transporting an optical signal 6 or an electrical signal 11. The above examples describe apparatus and methods for use in conjunction with node 12.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims— other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. An apparatus comprising:
    a plurality of output lines;
    a plurality of multiplexers, each of the plurality of multiplexers coupled to a respective one of the plurality of output lines;
    a plurality of input lines, each of the plurality of input lines coupled to each of the plurality of multiplexers;
    a plurality of select lines, each of the plurality of select lines coupled to a controller and a respective one of the plurality of multiplexers; and
    wherein the controller dynamically couples at least one of the plurality of output lines to at least one of the plurality of input lines during a first clock cycle.

2. The apparatus of claim 1, wherein the controller dynamically couples a first number of the plurality of output lines to a first number of the plurality of input lines during a second clock cycle, the first number of the plurality of output lines and the first number of the plurality of input lines being equal.

3. The apparatus of claim 1, wherein the controller dynamically couples a first number of the plurality of output lines to a first number of the plurality of input lines during a second clock cycle, the first number of the plurality of output lines being less than the first number of the plurality of input lines.

4. The apparatus of claim 1, wherein a first number of the plurality of output lines is less than a first number of the plurality of input lines and the controller dynamically couples each of the plurality of output lines to one of the plurality of input lines during the first clock cycle such that at least one of the plurality of input lines is not coupled to one of the plurality of output lines.

5. The apparatus of claim 4, wherein the controller dynamically couples the at least one of the plurality of input lines not coupled to one of the plurality of output lines to one of the plurality of output lines during a second clock cycle.

6. The apparatus of claim 5, wherein the at least one of the plurality of input lines coupled during the second clock cycle is coupled to a selected one of the plurality of output lines based on a modulo operation of the first number of the plurality of output lines and the first number of the plurality of input lines.

7. The apparatus of claim 1, wherein the apparatus is incorporated into one of a switch or a reconfigurable optical add drop multiplexer.

8. A method comprising:
    dynamically coupling, by a controller, at least one of a plurality of output lines to at least one of a plurality of input lines during a first clock cycle;
    wherein the controller is coupled to each of a plurality of select lines, each of the plurality of select lines being coupled to a respective one of a plurality of multiplexers; and
    wherein each the plurality of multiplexers is coupled to a respective one of the plurality of output lines and each of the plurality of multiplexers is coupled to each of a plurality of input lines.

9. The method of claim 8, further comprising dynamically coupling, by the controller, a first number of the plurality of output lines to a first number of the plurality of input lines during a second clock cycle, the first number of the plurality of output lines and the first number of the plurality of input lines being equal.

10. The method of claim 8, further comprising dynamically coupling, by the controller, a first number of the plurality of output lines to a first number of the plurality of input lines during a second clock cycle, the first number of the plurality of output lines being less than the first number of the plurality of input lines.

11. The method of claim 8, wherein a first number of the plurality of output lines is less than a first number of the plurality of input lines and further comprising dynamically coupling, by the controller, each of the plurality of output lines to one of the plurality of input lines during the first clock cycle such that at least one of the plurality of input lines is not coupled to one of the plurality of output lines.

12. The method of claim 11, further comprising dynamically coupling, by the controller, the at least one of the plurality of input lines not coupled to one of the plurality of output lines to one of the plurality of output lines during a second clock cycle.

13. The method of claim 12, wherein the at least one of the plurality of input lines coupled during the second clock cycle is coupled to a selected one of the plurality of output lines based on a modulo operation of the first number of the plurality of output lines and the first number of the plurality of input lines.

14. The method of claim 8, wherein the controller is incorporated into one of a switch or a reconfigurable optical add drop multiplexer.

15. A non-transient computer readable medium containing program instructions for causing a processor to perform a process comprising:
dynamically coupling, by a controller, at least one of a plurality of output lines to at least one of a plurality of input lines during a first clock cycle;
wherein the controller is coupled to each of a plurality of select lines, each of the plurality of select lines being coupled to a respective one of a plurality of multiplexers; and
wherein each the plurality of multiplexers is coupled to a respective one of the plurality of output lines and each of the plurality of multiplexers is coupled to each of a plurality of input lines.

16. The non-transient computer readable medium of claim 15, further comprising dynamically coupling, by the controller, a first number of the plurality of output lines to a first number of the plurality of input lines during a second clock cycle, the first number of the plurality of output lines and the first number of the plurality of input lines being equal.

17. The non-transient computer readable medium of claim 15, further comprising dynamically coupling, by the controller, a first number of the plurality of output lines to a first number of the plurality of input lines during a second clock cycle, the first number of the plurality of output lines being less than the first number of the plurality of input lines.

18. The non-transient computer readable medium of claim 15, wherein a first number of the plurality of output lines is less than a first number of the plurality of input lines and further comprising dynamically coupling, by the controller, each of the plurality of output lines to one of the plurality of input lines during the first clock cycle such that at least one of the plurality of input lines is not coupled to one of the plurality of output lines.

19. The non-transient computer readable medium of claim 18, further comprising dynamically coupling, by the controller, the at least one of the plurality of input lines not coupled to one of the plurality of output lines to one of the plurality of output lines during a second clock cycle.

20. The non-transient computer readable medium of claim 19, wherein the at least one of the plurality of input lines coupled during the second clock cycle is coupled to a selected one of the plurality of output lines based on a modulo operation of the first number of the plurality of output lines and the first number of the plurality of input lines.

* * * * *